United States Patent [19]
Arazi et al.

[11] Patent Number: 5,966,120
[45] Date of Patent: Oct. 12, 1999

[54] METHOD AND APPARATUS FOR COMBINING AND DISTRIBUTING DATA WITH PRE-FORMATTED REAL-TIME VIDEO

[75] Inventors: Efraim Arazi; Adam S. Tom; Paul Shen, all of San Francisco; Edward A. Krause, El Cerrito, all of Calif.

[73] Assignee: Imedia Corporation, San Francisco, Calif.

[21] Appl. No.: 08/561,010

[22] Filed: Nov. 21, 1995

[51] Int. Cl.[6] .................................................. H04N 7/12
[52] U.S. Cl. .......................... 345/327; 348/12; 348/473; 370/505
[58] Field of Search .................................. 348/7, 12, 13, 348/385, 387, 386, 389, 420, 423, 462, 473, 489; 455/4.2, 5.1, 6.1; 370/477, 505, 506, 521, 523, 528; 375/363; 345/327; H04N 7/12

[56] References Cited

U.S. PATENT DOCUMENTS

| | | | |
|---|---|---|---|
| 4,755,993 | 7/1988 | Grover | 370/110.1 |
| 5,168,353 | 12/1992 | Walker et al. | 358/86 |
| 5,267,334 | 11/1993 | Normille et al. | 382/56 |
| 5,305,113 | 4/1994 | Iwamura et al. | 358/312 |
| 5,315,584 | 5/1994 | Savary et al. | 370/18 |
| 5,319,707 | 6/1994 | Wasilewski et al. | 380/14 |
| 5,359,601 | 10/1994 | Wasilewski et al. | 370/73 |
| 5,386,213 | 1/1995 | Haupt et al. | 341/67 |
| 5,400,401 | 3/1995 | Wasilewski et al. | 380/9 |
| 5,418,782 | 5/1995 | Wasilewski | 370/73 |
| 5,420,640 | 5/1995 | Munich et al. | 348/525 |
| 5,420,866 | 5/1995 | Wasilewski | 370/110.1 |
| 5,448,568 | 9/1995 | Delpuch et al. | 372/94.2 |
| 5,452,006 | 9/1995 | Auld | 348/390 |
| 5,461,619 | 10/1995 | Citta et al. | 370/83 |
| 5,493,339 | 2/1996 | Birch et al. | 348/461 |
| 5,506,904 | 4/1996 | Sheldrick et al. | 380/23 |
| 5,519,780 | 5/1996 | Woo et al. | 348/467 |
| 5,583,562 | 12/1996 | Birch et al. | 348/12 |
| 5,612,742 | 3/1997 | Krause et al. | 348/385 |
| 5,650,825 | 7/1997 | Naimpally et al. | 348/465 |
| 5,757,416 | 5/1998 | Birch et al. | 348/6 |
| 5,793,410 | 8/1998 | Rao | 348/7 |

FOREIGN PATENT DOCUMENTS

| | | | |
|---|---|---|---|
| 0 517 564 A1 | 12/1992 | European Pat. Off. | H04N 7/00 |
| 0 692 914 A2 | 1/1996 | European Pat. Off. | H04N 7/52 |
| WO 94/30014 | 12/1994 | WIPO | H04N 7/13 |
| WO 95/15647 | 6/1995 | WIPO | H04N 7/025 |

OTHER PUBLICATIONS

U. Riemann, "Der MPEG–2–Standard Generische Codierung für Bewegtbilder und zugehöriger Audio–Information—Multiplex–Spezifikation für die flexible Übertragung digitaler Datenströme (Teil52)," Fernseh–und Kino–Technik, vol. 48, No. 10, pp. 545–553 (Oct. 1994), XP000468290.

Aravind, Rangarajan et al., Image and Video Coding Standards, *AT&T Technical Journal*, Jan./Feb. 1993, pp. 67–91.

*Primary Examiner*—Nathan Flynn
*Attorney, Agent, or Firm*—McCutchen, Doyle, Brown & Enersen, LLP

[57] ABSTRACT

A system for providing efficient constant bit rate distribution of variable bit-rate encoded video programs while facilitating the distribution of encoded video programs, along with Auxiliary Data of a general character, to one or more receivers. At a particular receiver, a customized augmented video program is created by inserting selected portions of the Auxiliary Data into a selected encoded video program. The encoded video portion of the augmented video program can be transmitted, decoded and displayed in real time, while the Auxiliary Data need not be transmitted in real time but can be stored locally at the receiver for real-time presentation at a later time. Real time presentation might include insertion into the video program while non real-time presentation might include insertion into non-video applications separate from the video program.

26 Claims, 6 Drawing Sheets

METHOD AND APPARATUS FOR COMBINING AND DISTRIBUTING DATA WITH PRE-FORMATTED REAL-TIME VIDEO

BACKGROUND OF THE INVENTION

1. Field of the Invention

The present invention relates to the distribution and reception of compressed video information. More particularly, the invention relates to providing constant bit rate distribution of variable bit rate-encoded video programs while facilitating the distribution of auxiliary data of a general character to one or more receivers; and to receiving the distributed video information and creating a customized video program for presentation at each individual receiver.

2. Background

The present invention relates to the encoding, formatting, distribution and reception of compressed video programs. Video programs are often encoded using a particular video compression technique known as variable bit-rate (VBR) encoding. VBR encoding can be used to overcome the well-known problem of most video compression encoders wherein the image quality tends to vary as a function of image complexity. Typically, a video program will contain a variety of scenes. Many of these scenes are lacking in motion or detail and are therefore easily compressed. However, other scenes containing complex details may be more difficult to compress, particularly when moving in a complex or random manner. Therefore, unless the available bandwidth is very high, the perceived quality of the decompressed and reconstructed images will tend to vary from one scene to the next. This problem becomes more serious as the available bandwidth is reduced until, eventually, the video becomes unacceptable, often because of just a few problem scenes.

VBR encoding overcomes this problem by allocating more bits to those scenes which are difficult to compress and fewer bits to those scenes which are more easily compressed. In this way, the decompressed and reconstructed images can be made to appear consistently uniform and therefore superior to the reconstructed images derived from a constant bit-rate (CBR) encoder adjusted for the same average rate of compression. As a result, it is possible to compress a video program more efficiently by using the VBR encoding technique. This increases the number and variety of programs or program streams that can be delivered over a fixed-bandwidth communication channel, reduces the storage capacity requirements at the head end or other site where the program library is maintained, and reduces the storage capacity requirements at the head end or other site where the program streams are to be distributed over a fixed-bandwidth communication channel.

The disadvantage of the VBR encoding technique is that it presents certain problems when manipulating or editing the compressed bit-streams. In particular, it becomes difficult to efficiently utilize a fixed-bandwidth communication channel since the variable bit-rate stream may at times exceed the capacity of the channel, while at other times, it may utilize only a fraction of the available channel capacity. As would be clear to one in the art, the possibility of exceeding the capacity of the channel is also a problem with non-VBR encoded data.

One known technique that is used to alleviate this problem is to buffer the compressed bit-stream at the transmission end of the communication channel in order to convert the variable rate stream to a constant rate stream. In such a case, it is also necessary to buffer the signal received at the other end of the channel in order to recover the variable rate stream that is necessary for proper timing of the reconstructed video images. Unfortunately, the required amount of buffering required to convert a variable rate input to a constant rate output, would be prohibitively expensive and would introduce long delays into the distribution system. Moreover, existing video compression standards such as the MPEG standard specify limits on the amount of buffering required for conforming decoders. Therefore, it is important that the received bit-streams be decodable without exceeding these limits.

Another prior art technique that can be used to reduce the inefficiency of distributing VBR encoded (and non-VBR encoded) programs over a fixed-bandwidth channel combines a plurality of program streams into a single multiplex. Although each additional program stream will increase the overall data rate of the multiplex, the average per-stream variance compared to the variance of the original individual streams will tend to decrease in approximate proportion to the number of streams, assuming approximate statistical independence among them. Therefore, if the nominal rate that can be accommodated by the channel is significantly greater than the average rate of a single program stream, then the channel utilization can be significantly improved. This technique is known in the art as statistical multiplexing.

When using buffering, one prior art method of assuring that buffer overflow does not occur is to provide feedback between the buffer and the encoder. When the buffer approaches a full state, a buffer fullness signal from the buffer informs the encoder to reduce the bit-rate so that the buffer does not overflow. When the buffer has more room, the feedback signal, from the buffer to the encoder, enables the encoder to increase the bit-rate in order to maintain image quality. Such feedback is particularly effective when combined with statistical multiplexing. In such a case, a single buffer may be at the output of the multiplexer, and feedback from that buffer is to all the encoders of the programs being multiplexed. Because the multiplexing reduces effective per-stream data rate variance, in general, less buffering would be required to convert the multiplex to a fixed bit-rate stream than if each individual encoder included a VBR-to-constant bit-rate buffer.

The combination of buffering with statistical multiplexing with feedback for conveying encoded (particularly VBR encoded) program streams over fixed-bandwidth channels, can be effective but generally may not be sufficient when efficient utilization of the entire channel is important.

In addition, there are often situations where no feedback is possible between the output buffer of the multiplexer and the individual encoders. One such situation occurs when multiplexing previously encoded data streams. Another occurs when the encoders are located in an area physically remote from the multiplexer. Both these situations are referred to herein as remote encoding, indicating that encoding and multiplexing are remote in time, location, or otherwise, so that no feedback is possible from the multiplexer to the encoders of the program streams to be multiplexed.

In many applications a library of auxiliary data, which exists independently of the encoded video data, may need to be selectively distributed to the same set of receivers that receive video programs, or to a different set of receivers connected to the same distribution network. The auxiliary data may be of any general type, including additional encoded video data. Suitable examples of independent libraries of auxiliary data are storage systems containing advertisements, promotional features or previews, news and other informational content, or data for computer-related applications. Such auxiliary data may be either compressed or uncompressed. They may be selectively directed to certain individual receivers or to certain pre-defined subsets of the entire receiver population. Such pre-defined subsets may vary over time in response to certain information that is known, gathered, or inferred by arbitrary means. For example, one subset of receivers may subscribe to a service that provides local news, while a second, possibly overlapping, subset of receivers may choose to receive one of many different categories of advertisements.

Methods for addressing arbitrary subsets of the receiver population are easily implemented within the MPEG-2 standard ISO/IEC 13818 (hereinafter called "MPEG"). Each component of an MPEG-compatible data multiplex is assigned an unique program identification number (PID). For example, a first video program, included in the multiplex, may be comprised of one video stream and two audio streams, and these components may be identified by PID values of 1, 2, and 3 respectively. Similarly, a second video program, included in the same multiplex, may be comprised of one video stream, four audio streams, and one teletext data stream, and these components may be assigned PID values of 4 through 9, respectively. If ten additional streams are to be extracted from an independent library and included in the data multiplex, then these appended streams could be assigned PID values of 10 through 19, respectively. In this way, all audio, video, or data stream components of all programs contained within a multiplex would be assigned unique PID's, regardless of whether the programs originate from an independent library or otherwise.

MPEG's system layer specification also includes provisions for embedding tables or program maps within the bit-stream to identify the different programs contained within the multiplex and to establish a correspondence between these programs and the PIDs associated with their audio, video, or data components. In addition, different types of programs can be classified into groups, and each such group can be assigned a unique identifier. These unique identifiers can be included in the embedded program tables, with one or more identifiers assigned to each program.

SUMMARY OF THE INVENTION

It is an object of the invention to provide for efficient real-time distribution of one or more variable bit-rate programs to one or more receivers. In cases where a plurality of programs are multiplexed together and distributed simultaneously, it is possible, in the context of the present invention, for one or more of these programs to be encoded at a constant bit rate. Typically, each variable bit rate or constant bit rate program will consist of a video stream component, one or more audio stream components, and possibly one or more data stream components. Each of these real-time distributed programs are hereinafter referred to as primary programs.

It is another object of the invention to selectively distribute auxiliary data, of a general character, to one or more receivers. The auxiliary data is distributed in non-real time using any available channel capacity, and is stored locally at the selected receivers for real-time presentation at a later time.

In accordance with the foregoing, one aspect of the invention comprises a method and apparatus for efficient CBR distribution of primary programs, along with auxiliary data of a general character, to one or more receivers. A primary data stream, comprising at least one VBR program, and possibly one or more CBR programs, is converted to a CBR data stream by inserting auxiliary data where fill packets would have otherwise been used to create a CBR data stream.

Typically, the auxiliary data may be differentiated from the primary programs in that the auxiliary data need not be distributed in real time. By doing away with the requirement for real-time or near real-time distribution of at least a portion of the program multiplex, it becomes easier to efficiently utilize the available channel bandwidth. Once the real-time component of the multiplex has been formed using prior art techniques, the remaining channel bandwidth can be used to accommodate the non-real time component. In this way it becomes possible to attain 100% channel utilization as long as there exists some non real-time data in the queue awaiting distribution. Thus, the CBR distribution data stream is created, and data transmission capacity is increased, by the insertion of auxiliary data in space that would otherwise be wasted.

In an exemplary embodiment of this aspect of the invention, the primary programs and the auxiliary data are each assumed to be divided into segments or packets. The next packet of auxiliary data is inserted inbetween the packets of the primary programs whenever the distribution channel is idle for a time interval that is at least as long as the time interval needed to transmit the next packet of auxiliary data. In addition, MPEG-compliant program map data illustrating the location of each of the primary program or auxiliary data stream components in the multiplexed data stream are inserted into the data stream for use at the receivers. Such program maps are described in §2.4.4 of the MPEG system layer documentation, ISO/IEC 13818-1.

In connection with the foregoing, another aspect of the invention comprises a method and apparatus for receiving the CBR distribution data stream at a particular receiver, and combining a selected primary program with selected auxiliary data to create a customized augmented program for that particular receiver. The receiver is configured with sufficient local storage to buffer the selected auxiliary data until they are needed, for insertion into the selected primary program or for other presentation, at a later time.

In an exemplary embodiment of this aspect of the invention, a receiver program selector receives the distribution data stream and uses a program map embedded therein to direct program and auxiliary data multiplexers (MUXes) to extract a selected primary program and selected portions of the auxiliary data stream, respectively. A video augmentation unit then inserts the selected auxiliary data into the primary program stream to create an augmented primary program which is supplied for decoding and viewing. In the typical case the auxiliary data comprises short program segments including both video and audio data.

In this way, individual receivers which include some form of local storage could be programmed to receive certain program segments or certain types of program segments at any time of the day. For example, all new car advertisements could be classified together and assigned a unique group identification number. If such advertisements are periodically extracted from an auxiliary data library and combined with the multiplexed primary programs prior to distribution, then the program map embedded in the distribution data stream would be updated to reflect such additions. A receiver that has been programmed to receive all advertisements pertaining to new automobiles, and which is monitoring the received bit stream, could detect such an advertisement by matching the relevant group classification number in the embedded program table with an internal list representative of the types of programs which it has been programmed to receive. The PIDs corresponding to any associated audio, video, or data streams comprising the advertisement, could then be extracted from the distribution data stream and copied to local storage for viewing at a later time.

In an alternative embodiment of the invention, the selected auxiliary data need not be combined with a primary program, but can be maintained separately for independent presentation as in the case of non-video data. For example, the new car advertising mentioned above could take the form of brochures to be printed on a receiver's printer or an interactive computer demo to be displayed on his computer.

BRIEF DESCRIPTION OF THE DRAWINGS

The objects, features and advantages of the present invention will be apparent from the following detailed description, in which.

DETAILED DESCRIPTION OF THE INVENTION

A method and apparatus are disclosed for use in a distribution system wherein augmented program streams are envisioned. The augmented program streams may include both video and audio data and other, auxiliary data that is not real-time dependent. Although the present invention is described predominantly in terms of the transmission and storage of video and audio information encoded in accordance with the MPEG format, the concepts and methods are broad enough to encompass distribution systems using other data compression techniques. Throughout this detailed description, numerous details are specified such as program types and data stream organizations, in order to provide a thorough understanding of the present invention. To one skilled in the art, however, it will be understood that the present invention may be practiced without such specific details. In other instances, well-known control structures and encoder/decoder circuits have not been shown in detail in order not to obscure the present invention. Particularly, many functions are described to be carried out by various components within a compressed video distribution system. Those of ordinary skill in the art, once the functionality to be carried out by such circuits is described, will be able to implement the necessary components without undue experimentation.

Figure 1:
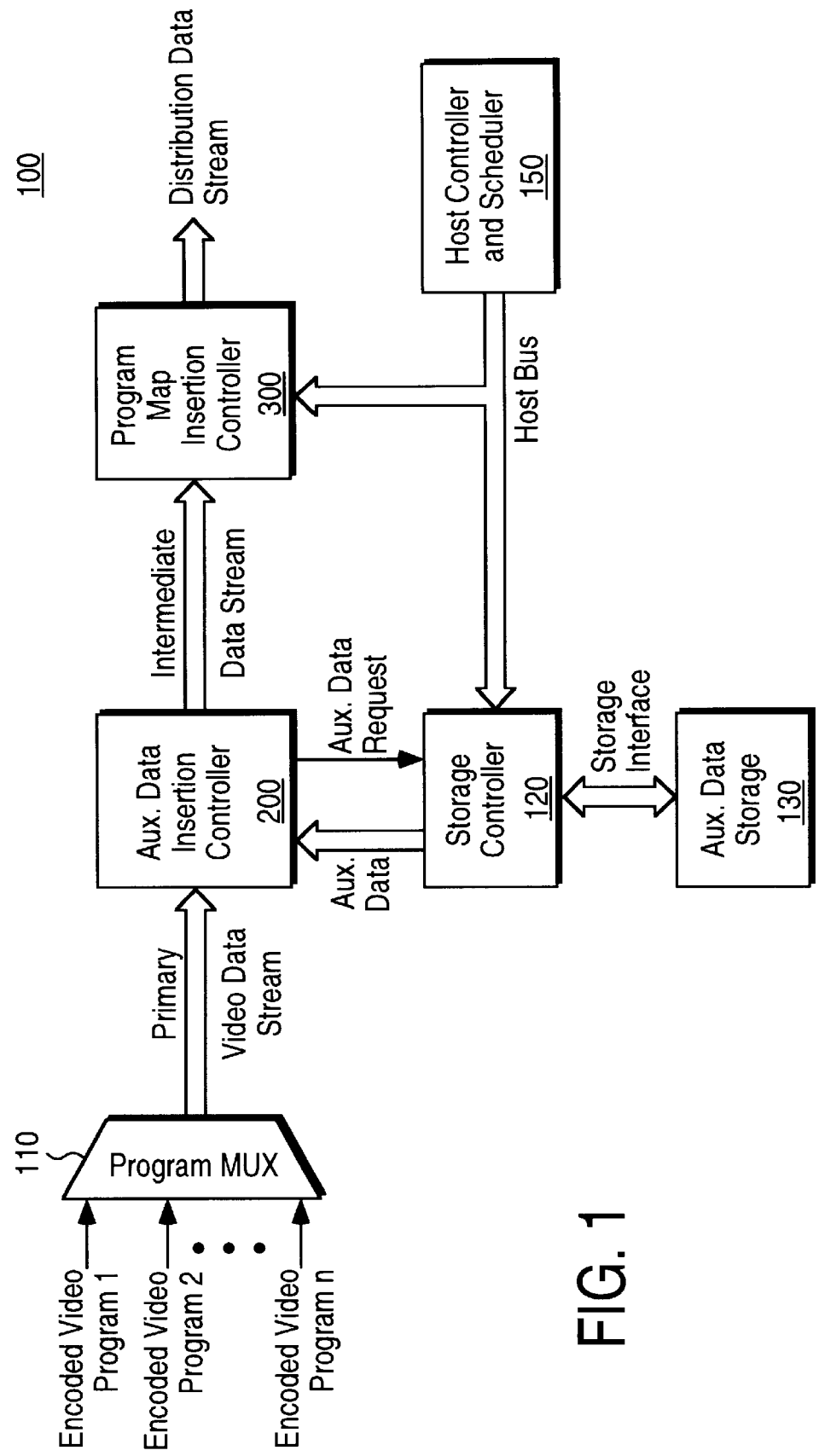
FIG. 1 illustrates a system for generating a constant bit rate Distribution Data Stream comprising a Primary Video Data Stream and an Auxiliary Data Stream, where the Primary Video Data Stream includes a plurality of multiplexed, variable bit rate encoded Video Programs, and the Auxiliary Data Stream contains other information.

Referring now to FIG. 1, there is shown one embodiment of a system for combining real time data with auxiliary data to produce a constant bit rate (CBR) data stream for efficient distribution. For example, the real time data may be variable bit rate (VBR) encoded video programs and the auxiliary data may be any other form of data, e.g., teletext, advertising, or other encoded video. Thus, the CBR data stream is augmented to carry Auxiliary Data in the portion of the Primary Video Data Stream that would otherwise be wasted. The Encoded Video Programs (e.g., MPEG video) are received in real-time from n different sources and combined by the Program Multiplexer (MUX) 110 into a single Primary Video Data Stream. In this example, the output of the Program MUX 110 is provided at a CBR matched to the CBR video distribution channel. The Program MUX 110 ensures this CBR by inserting fill packets into the Primary Video Data Stream whenever its data rate would otherwise be less than that of the video distribution channel. The design of such a multiplexer is well known to those skilled in the art, for example, in the context of MPEG-compatible encoders where the fill packets are known as "stuffing bits."

In some applications it may also be necessary to ensure that the output data rate does not exceed the data rate of the video distribution channel. The fill packets, which typically serve as delay buffers without conveying useful information, may be replaced with Auxiliary Data that do not require real time distribution. The Auxiliary Data are extracted from the Distribution Auxiliary Data Storage 130 by the Distribution Storage Controller 120 and combined with the Primary Video Data Stream by the Auxiliary Data Insertion Controller 200.

Figure 2:
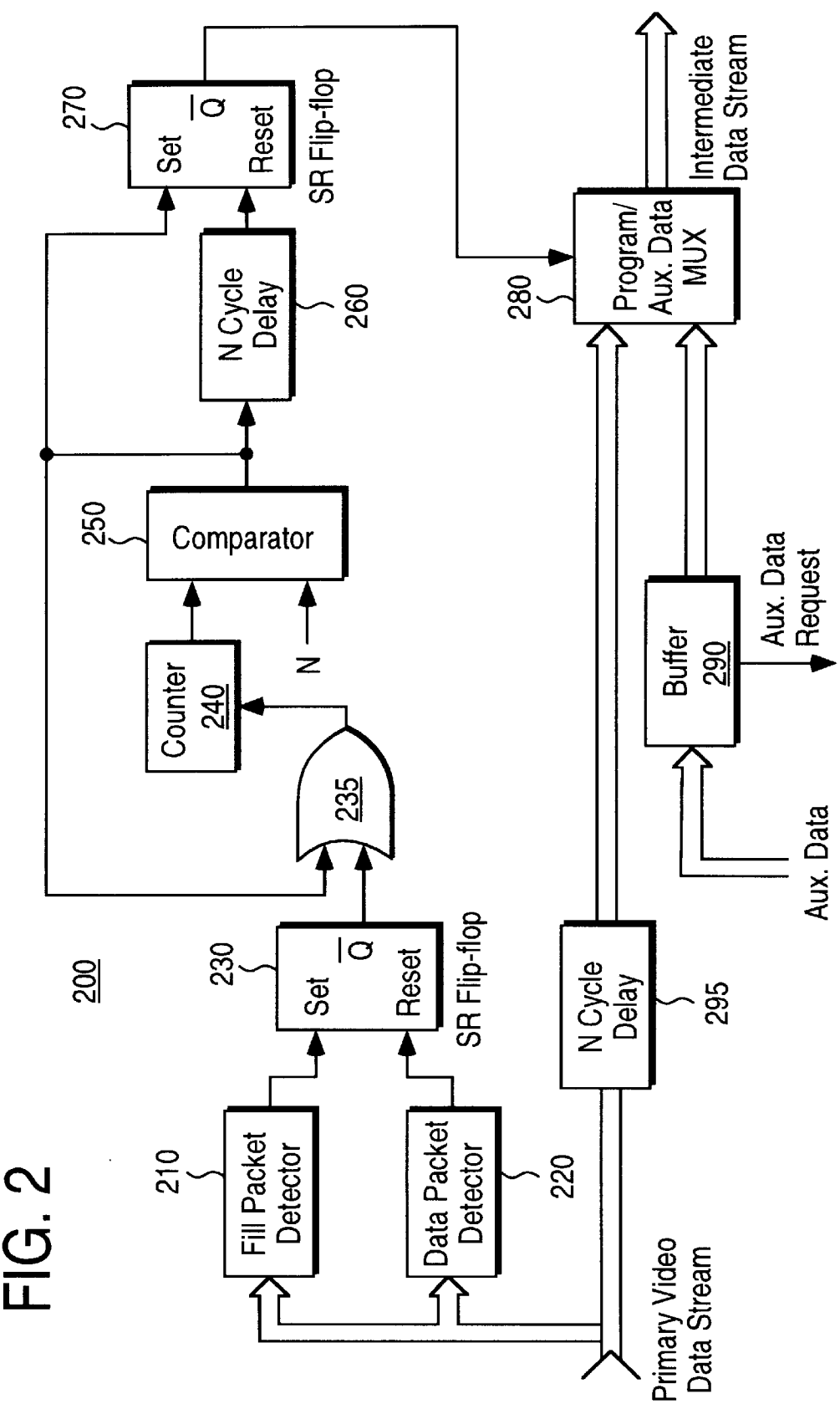
FIG. 2 illustrates an Auxiliary Data Insertion System for creating an Intermediate Data Stream by inserting the Auxiliary Data Stream into the Primary Video Data Stream in accordance with the fullness of the Primary Video Data Stream.

FIG. 2 illustrates Auxiliary Data Insertion Controller 200 in greater detail. The Primary Video Data Stream is sent to a Fill Packet Detector 210 and a Data Packet Detector 220, which provide active enable outputs upon detection of fill packets and data packets, respectively. The outputs of Fill Packet Detector 210 and Data Packet Detector 220 are sent to the set and reset terminals respectively of SR Flip Flop 230, which provides an inverted output of logical 1 output when the Primary Video Data Stream consists of a data packet and a logical 0 when the Primary Video Data Stream consists of a fill packet. In alternative embodiments of the present invention, those of ordinary skill in the art will recognize that other designs may reverse the polarities of the various signals described above and in the following.

The output of Flip Flop 230 is sent to OR logic 235 together with an output of Comparator 250. As will be described below, the output of Comparator 250 is a logical 1 when the fill packet length is sufficiently long to allow replacement of fill packet data by Auxiliary Data. Thus, initially, before a fill packet is detected, the output of OR logic 235 is a logical 1, which resets the output of Counter 240 to zero, and since 0 is less than N, the assumed size of all packets of auxiliary data, the output of Comparator 250 is a logical 0. Then, when a fill packet is first detected by Fill Packet Detector 210, it will set the SR Flip Flop 230, thereby causing the inverted output of the SR Flip Flop to become a logical 0. Next the output of OR gate 235 will change from logical 1 to logical 0, since both of its inputs are now 0, and this will cancel the reset of Counter 240, thereby enabling it to begin counting. The counter will continue incrementing until one of two conditions occur. The first condition is satisfied if Data Packet Detector 220 detects a next data packet, causing SR Flip Flop 230 to reset, thereby causing OR gate 235 to output a logical 1, thereby causing Counter 240 to reset to 0. The second condition is satisfied if the output of Counter 240 becomes equal to N. This causes Comparator 250 to output a logical 1 to SR Flip Flop 270 to direct Program/Auxiliary Data MUX 280 to replace the fill packet with Auxiliary Data. If the duration of the fill packet is at least N cycles, then at least one Auxiliary Data packet can be inserted into the bit stream (assuming that all Auxiliary Data packets are N cycles in duration). That is, the purpose of the Flip Flop 270 is to measure a fixed time interval of exactly N cycles and to output a replace packet enable signal during this time interval for signaling the Program/Auxiliary Data MUX 280 to select data from the Auxiliary Data Storage 130 (via Buffer 290) instead of the Primary Video Data Stream. The multiplexing of Auxiliary Data continues for N cycles, at which time an entire Auxiliary Data packet has been inserted and the Flip Flop 270 is reset, via N-Cycle Delay Counter 260, to indicate completed multiplexing of an N-cycle Auxiliary Data packet and to suspend further multiplexing at Program/Auxiliary Data Multiplexer 280. The logical 1 output of Comparator 250 is also sent through OR logic 235 to reset Counter 240, which in turn causes the output of Comparator 250 to return to a logical 0 state, thereby enabling Counter 240 to begin measuring the duration of the next fill packet interval. Although Flip Flop 270 and Counter 240 are reset upon the occurrence of an N-cycle fill packet interval, it will be readily appreciated that the above-described counting and multiplexing process will continue to multiplex Auxiliary Data into the Primary Video Data Stream until a data packet is detected in the Primary Video Data Stream by Data Packet Detector 220.

The Auxiliary Data (from the Distribution Auxiliary Data Storage 130 via Distribution Storage Controller 120 of FIG. 1) are accumulated using a Buffer 290 to ensure that the Auxiliary Data are always available when needed. The Auxiliary Data Request Signal (sent from the Auxiliary Data Insertion Controller 200 to the Distribution Storage Controller 120 in FIG. 1) is reflective of the amount of data in the Buffer 290, and is used to signal the Distribution Storage Controller 120 when additional Auxiliary Data are required to prevent the Buffer 290 from underflowing.

Figure 3:
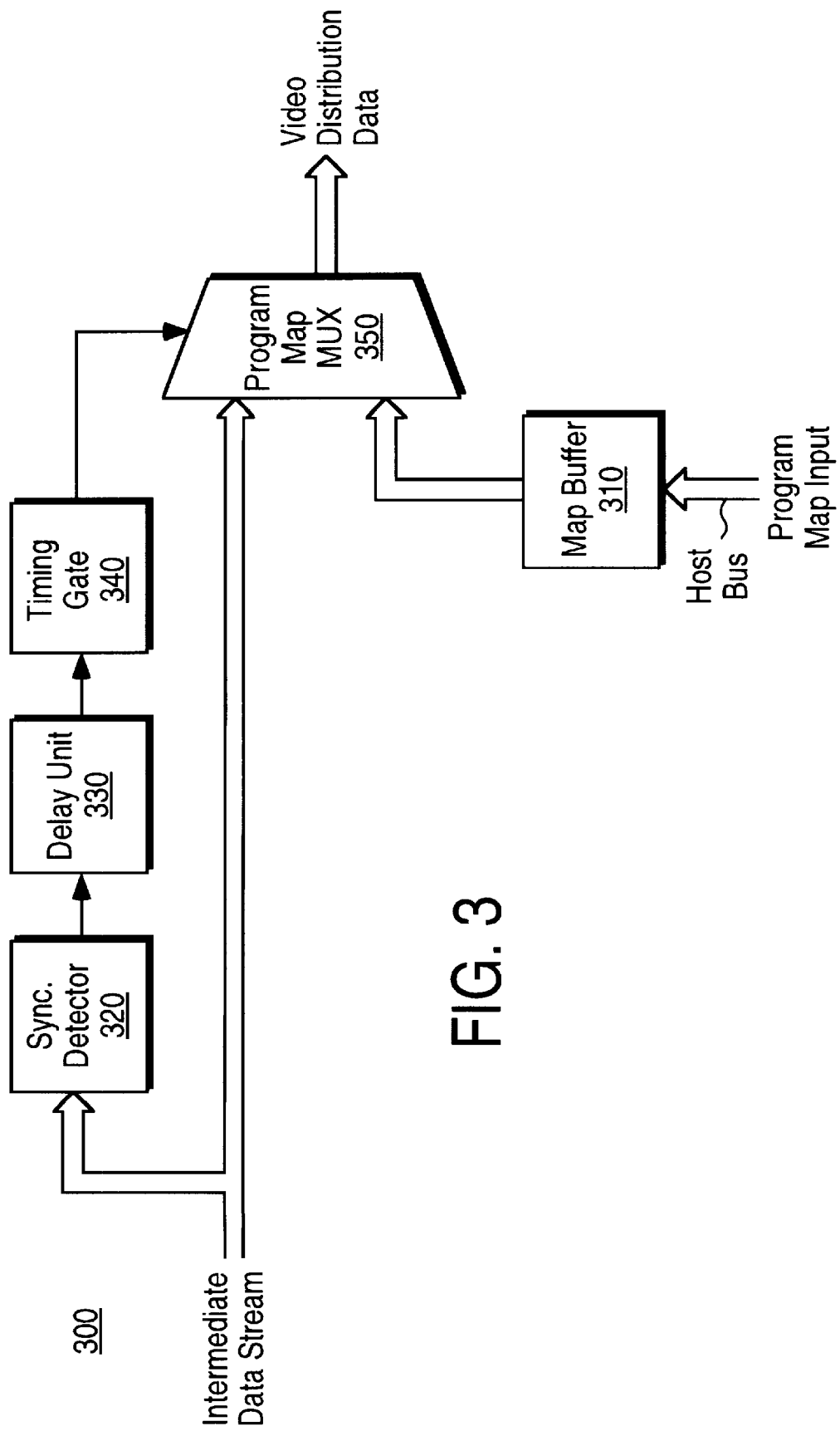
FIG. 3 illustrates a Program Map Insertion System for imbedding program map information into the Intermediate Data Stream to create a Video Distribution Data Stream.

The operation of both the Distribution Storage Controller 120 and the Program Map Insertion Unit 300 can be controlled by the Host Controller and Scheduler 150, as shown in FIG. 3. In this example, the program map is generated by the Host Controller 150 and inserted into a Program Map Buffer 310 located in the Program Map Insertion Unit 300. The Program Map Insertion Unit 300 parses the bit stream and inserts the program map data from the Program Map Buffer 310 at the appropriate time. An insertion command would be provided to Program Map Multiplexer 350 upon detection of an appropriate signal at a Synchronization Detector 320, after an optional delay via Delay Unit 330, and would continue for a predetermined interval specified by Timing Gate 340. The particular choice of synchronization, delay, and timing signals will depend on the particular encoding standard being used, and are well known to those skilled in the art. For example, in the MPEG specification, these signals are defined in §2.4.4 of the MPEG System Layer Documentation, ISO/IEC-13818-1.

Figure 4:
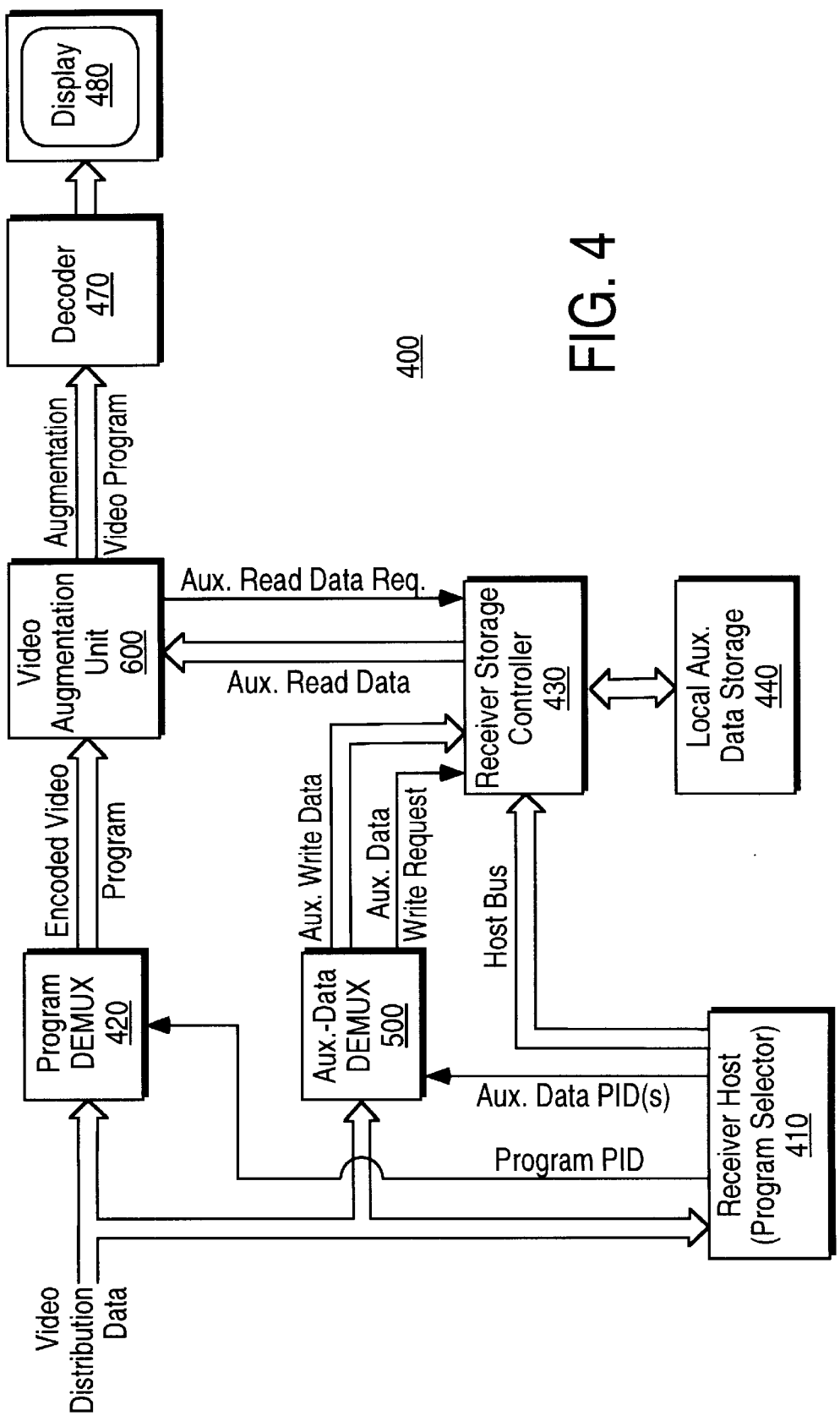
FIG. 4 illustrates a system for receiving a constant bit rate Video Distribution Data Stream, extracting a selected Primary Encoded Video Program and the Auxiliary Data Stream, and associating selected portions of the Auxiliary Data Stream with the selected Primary Encoded Video Program to create an Augmented Video Data Stream for decoding and display at a receiver.

FIG. 4 shows a system for receiving a Video Distribution Data Stream, extracting a selected Primary Encoded Video Program and the Auxiliary Data Stream, and inserting selected portions of the Auxiliary Data Stream into the Encoded Video Program to create a customized Augmented Video Program for display at the receiver. As an example, the system may be used for inserting narrowcast (targeted) advertising into the Video Program. That is, the Auxiliary Data would be comprised of encoded video and audio data, and would be used for delayed insertion into the Encoded Video Program. As another example, the Auxiliary Data could be related to, but physically independent of, the Encoded Video Program. For example, the Auxiliary Data could be promotional coupons transmitted to the recipient's printer for goods or services related to the theme of the Encoded Video Program. In general, any type of Auxiliary Data can be handled at the receiver provided it is appropriately identified within the Video Distribution Data Stream.

In the described embodiment, all data streams are MPEG-compatible. Each component of an MPEG-compatible data stream is assigned an unique program identification number (PID). For example, a first Encoded Video Program may be comprised of one video stream and two audio streams, and these components may be identified by PID values of 1, 2, and 3 respectively. Similarly, a second video program may be comprised of one video stream, four audio streams, and one teletext data stream, and these components may be assigned PID values of 4 through 9 respectively. If ten Auxiliary Data packets are combined with the Encoded Video Programs, then these appended streams could be assigned PID values of 10 through 19 respectively. In this way, all components contained within a data stream are assigned unique PIDs.

MPEG includes provisions for embedding tables or program maps (see the MPEG system layer documentation, ISO/IEC-13818-1)within a data stream to identify different programs within the data stream and to establish a correspondence between these programs and the PID's associated with their various components. In addition, different types of programs can be classified into groups, and each such group can be assigned a unique identifier. These unique identifiers can be included in the embedded program maps, with one or more identifiers assigned to each program. In this way, individual receivers which include some form of local storage can be programmed to receive certain programs or certain types of programs at any time of the day.

For example, at the distribution end, all new car advertisements could be classified together and assigned a unique group identification number. If the advertisements are periodically added to the Auxiliary Data Stream and combined with the Primary Data Stream for distribution, then a program map embedded in the Distribution Data Stream would be updated to reflect this addition. A receiver that has been programmed (either locally or remotely) to receive all advertisements pertaining to new automobiles, would monitor the Distribution Data Stream and detect the appropriate advertisement by matching the relevant group classification number in the embedded program map with an internal list representative of the types of programs which it has been programmed to receive. The appropriate packets (identified by their PIDs) corresponding to the Auxiliary Data comprising the advertisement would then be extracted from the Distribution Data Stream and copied to local storage for access at a later time (as opposed to on-the-fly).

In a narrowcasting analogy to conventional broadcast television, a Video Program might be free to a viewer, with distribution costs covered by advertising to be inserted into commercial intervals encoded into the Video Program. Or, the receiver could access the advertisement independently of the Video Program, perhaps on a different device (e.g., an advertisement in the form of a computer demo or a coupon to be printed on a printer). The form of the Auxiliary Data is irrelevant as long as it can be encoded with appropriate PIDs and program map information.

The Receiving System 400 works as follows: Program Selector 410 parses the received Video Distribution Data Stream and extracts the program map. Based on the Program map, and any direct or indirect input from the user or remotely generated control signals, Primary Encoded Video Program PID values are provided to the Program DEMUX 420, which extracts the desired Primary Encoded Video Program from the Distribution Data Stream. Similarly, Auxiliary Data PID values are provided to the Auxiliary Data DEMUX 500, which extracts selected portions of the Auxiliary Data (hereafter called Local Auxiliary Data) to be transferred to Local Auxiliary Data Storage 440 via Receiver Storage Controller 430 for access at a later time.

Figure 5:
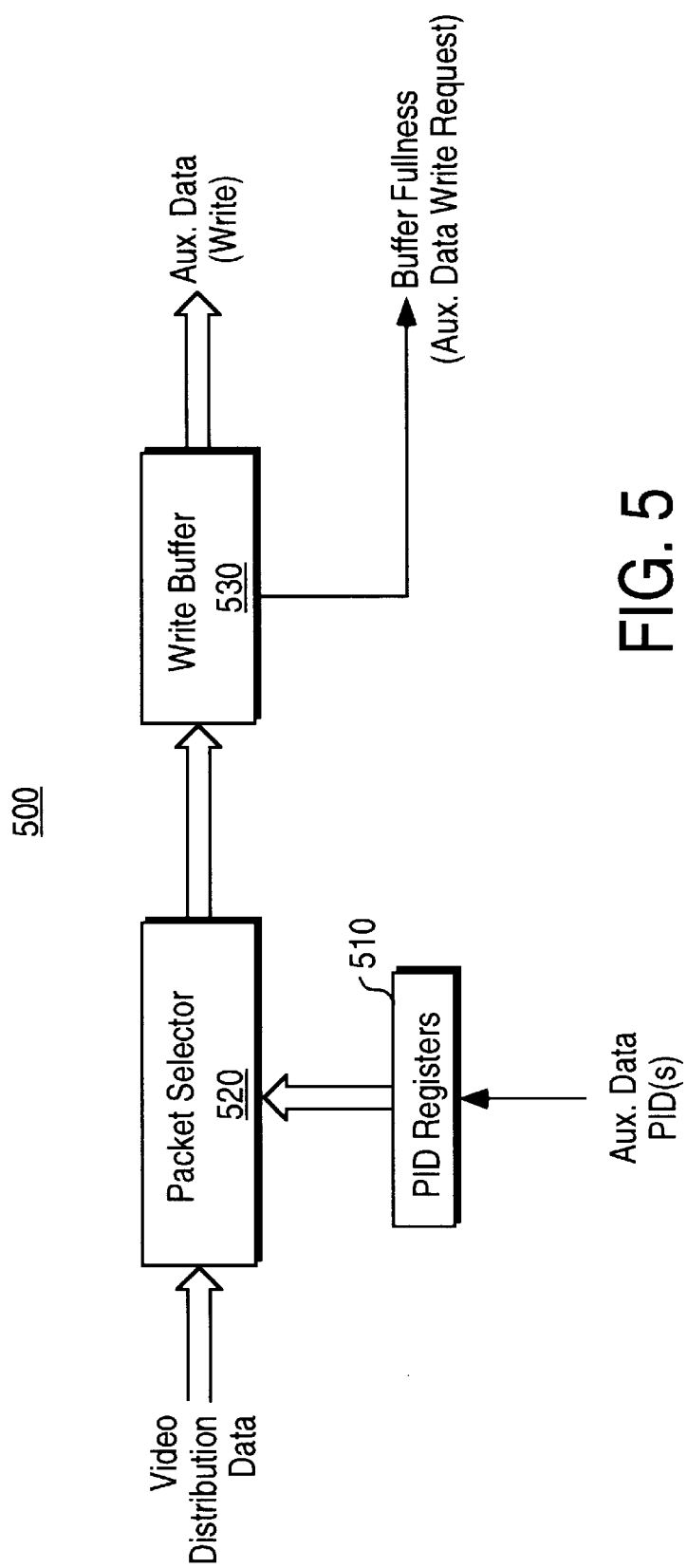
FIG. 5 illustrates an Auxiliary Data Demultiplexer, in accordance with the system of FIG. 4, for extracting the Auxiliary Data Stream from the Video Distribution Data Stream.

FIG. 5 shows that Auxiliary Data DEMUX 500 includes a Write Buffer 530 in order to simplify the interface with the Receiver Storage Controller 430. The Write Buffer 530 is important for situations when the Receiver Storage Controller 430 is unable to accept the Local Auxiliary Data in real time (as they are being provided from the Distribution Data Stream). As Write Buffer 530 is filled, it sends an Auxiliary Data Write Request to signal the Receiver Storage Controller 430 that accumulated Local Auxiliary Data are ready to be transferred to Local Auxiliary Data Storage 440.

In the exemplary embodiment of the invention, the Auxiliary Data also comprise video data. As shown in FIG. 4, the Local Auxiliary Data remain in Local Auxiliary Data Storage 440 until they are ready to be combined with a Primary Encoded Video Program. The Primary Encoded Video Program is selected from the Video Distribution Data Stream by a Program DEMUX 420 and passed to a Video Augmentation Unit 600 for combination with the Auxiliary Data from the Local Auxiliary Data Storage 440 to produce an Augmented Video Program. The Augmented Video Program is passed to a Decoder 470 for decoding and then to a Display 480 for viewing.

Figure 6:
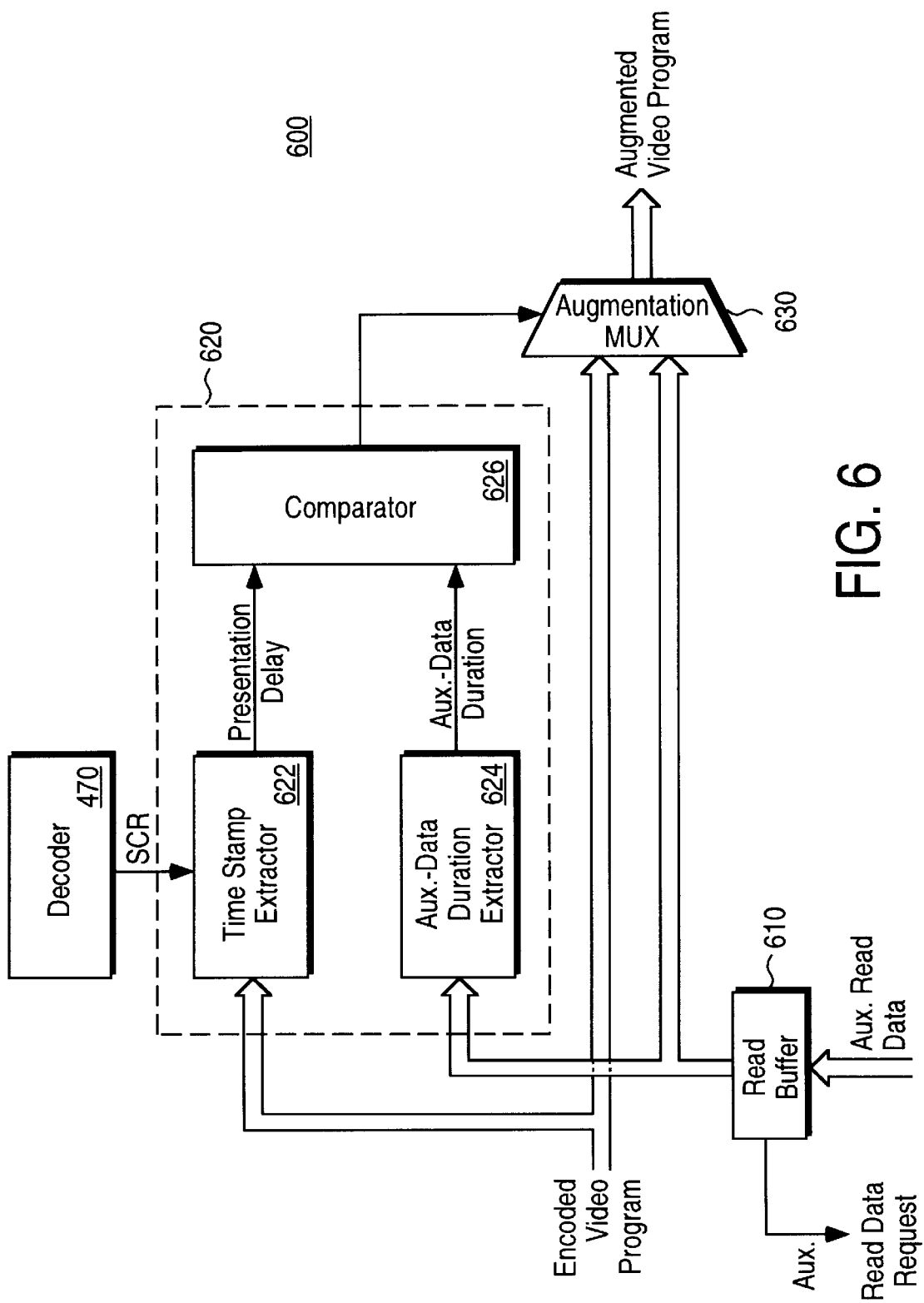
FIG. 6 illustrates an Augmentation Unit, in accordance with the system of FIG. 4, for creating the Augmented Video Data Stream by inserting selected portions of the Auxiliary Data Stream into the selected Primary Encoded Video Program.

FIG. 6 shows a Video Augmentation Unit 600 comprising an Insertion Detector 620, a Read Buffer 610, and an Augmentation Multiplexer 630. The Insertion Detector 620 interrogates the Encoded Video Program for opportunities to insert Local Auxiliary Data, and signals the Augmentation Multiplexer 630 accordingly. The Local Auxiliary Data are accumulated using a Read Buffer 610 to ensure that the Local Auxiliary Data are always available when needed. As the Read Buffer 610 empties, it sends an Auxiliary Read Data Request signal to signal the Receiver Storage Controller 430 that additional Local Auxiliary Data are required to prevent the Read Buffer 610 from underflowing.

In one embodiment, Insertion Detector 620 is configured for use in MPEG-compliant systems where the Local Auxiliary Data are automatically inserted whenever Presentation Delays of sufficient duration are encountered in the Encoded Video Program stream being received from the Program DEMUX 420. Such Presentation Delays can be determined by Time Stamp Extractor 622 by subtracting the current time (the Source Clock Reference or SCR from the Decoder 470) from the specified display time (the Presentation Time Stamp or PTS) of the next segment of the Encoded Video Program, and adjusting the result to account for the current delay due to decoder buffering. Comparator 626 compares the Presentation Delay with the duration of the next Local Auxiliary Data segment to be read from local storage as determined in Auxiliary Data Duration Extractor 624. If the Presentation Delay exceeds the duration of the Local Auxiliary Data segment, then the Local Auxiliary Data segment is selected by the Augmentation MUX 630.

In a preferred embodiment of the invention, special signals could be inserted into the Encoded Video Program prior to distribution in order to mark the appropriate points for Local Auxiliary Data insertion. In that case, Insertion Detector 620 would merely read the special signals directly from the Encoded Video Program without needing to compare Presentation Delays and Auxiliary Data Durations as discussed above. In that case, Insertion Detector 620 could be a single unit (rather than the trio of elements 622, 624 and 626) because it would only have to monitor the Encoded Video Program for the special signals and signal the Augmentation MUX 630 each time a special signal is detected.

However, as mentioned previously, the Augmented Video Program need not be solely of video type, but may contain computer programs, information to be sent to a printer, or any other non-video data. Therefore, in another alternative embodiment of the invention, the non-video portion of the Augmented Video Program could be diverted to other Access Devices (not shown in the figure) connected either in parallel with, or downstream of, the Decoder 470. Such an embodiment might be useful where the receiver is not the end user but a intermediate service provider. Thus, even when the Local Auxiliary Data are of non-video type, and do not need to be inserted into the Augmented Video Program, it may be convenient to transmit only a single data stream to the end user.

Conversely, in yet another alternative embodiment of the invention, the Local Auxiliary Data would be directly sent to other Access Devices without an Augmented Video Program ever being made. This could be achieved by eliminating Video Augmentation Unit 600 and passing the Local Auxiliary Data directly to the other Access Devices. In addition, since many applications do not require real-time presentation of the data, no local storage devices may be needed and, in such cases, Receiver Storage Controller 430 and Local Auxiliary Data Storage 440 could also be omitted.

The forgoing illustrates that, while the present invention has been disclosed with respect to certain particular embodiments, the invention is not limited to these embodiments and various modifications and changes thereto may be effected without departing from the spirit and scope of the invention.

What is claimed is:

1. A method of modifying a primary data stream, wherein the primary data stream comprises one or more variable bit rate programs, and wherein the primary data stream further comprises fill data, said method comprising:
   receiving the primary data stream;
   detecting fill data in the primary data stream;
   inserting an auxiliary data stream in place of the fill data; and
   adding location data for the programs and for the auxiliary data;
   to form a modified data stream for distribution to a plurality of receivers configured for individually extracting selected portions of the modified data stream in accordance with the location data.

2. A method of forming a modified data stream for distribution to a plurality of receivers, comprising the steps of:

statistically multiplexing a plurality of encoded video programs;

monitoring the statistically multiplexed encoded video programs for the occurrence of a fill packet;

maintaining a buffer of auxiliary data segments;

replacing the fill packet with at least one segment of the auxiliary data stream from the buffer if the segment is smaller than the size of the fill packet;

adding location data for the encoded video programs and for the auxiliary data;

to form a modified data stream for distribution to a plurality of receivers configured for individually extracting selected portions of the modified data stream in accordance with the location data.

3. The method of claim 2 wherein the step of adding the location data comprises:

monitoring the intermediate data stream for a synchronization signal;

determining an allowable location data duration; and inserting at least a portion of the location data during the location data duration.

4. The method of claim 3 wherein the modified data stream is encoded in a manner compatible with the MPEG standard.

5. A method of creating a receiver-specific customized display stream for an individual receiver, from a modified data stream sent to a plurality of receivers, comprising the steps of:

receiving a modified data stream at a receiver, the modified data stream comprising:
 a statistically multiplexed portion comprising one or more encoded video programs; and
 an auxiliary data portion comprising auxiliary data inserted in place of fill data;

determining location data from the modified data stream;

selecting an encoded video program from the statistically multiplexed portion of the modified data stream in accordance with a first predetermined characteristic of the receiver and the location data;

selecting local auxiliary data from the auxiliary data portion of the modified data stream in accordance with a second predetermined characteristic of the receiver and the location data;

storing the local auxiliary data; and associating the encoded video program and the local auxiliary data to form a receiver-specific augmented video program for decoding and display.

6. A method of creating a receiver-specific customized display stream for an individual receiver, from a modified data stream sent to a plurality of receivers, comprising the steps of:

receiving a modified data stream at a receiver;

determining location data from the modified data stream;

selecting an encoded video program in accordance with a first predetermined characteristic of the receiver and the location data;

selecting local auxiliary data from the modified data stream in accordance with a second predetermined characteristic of the receiver and the location data;

storing the local auxiliary data; and associating the encoded video program and the local auxiliary data to form a receiver-specific augmented video program for decoding and display;

wherein the step of selecting the local auxiliary data from the modified data stream includes temporarily accumulating the selected auxiliary data in a buffer and writing data from the buffer to a local auxiliary data storage in accordance with a fullness indication of the buffer.

7. A method of creating a receiver-specific customized display stream for an individual receiver, from a modified data stream sent to a plurality of receivers, comprising the steps of:

receiving a modified data stream at a receiver;

determining location data from the modified data stream;

selecting an encoded video program in accordance with a first predetermined characteristic of the receiver and the location data;

selecting local auxiliary data from the modified data stream in accordance with a second predetermined characteristic of the receiver and the location data;

storing the local auxiliary data; and associating the encoded video program and the local auxiliary data to form a receiver-specific augmented video program for decoding and display;

wherein the step of associating the encoded video program and the local auxiliary data includes;
 monitoring the encoded video program for at least one insertion interval;
 maintaining a buffer of local auxiliary data segments; and
 inserting at least one segment of the local auxiliary data into the insertion interval if the segment is smaller than the insertion interval.

8. The method of claim 7 wherein the insertion interval is determined in accordance with the MPEG standard.

9. The method of claim 8 wherein the monitoring the encoded video program for the insertion interval includes the steps of:

determining a presentation interval as a difference between a presentation time stamp and a system clock reference;

determining a duration of a segment of the local auxiliary data; and providing an insertion enable signal when the presentation interval is larger than the duration of the local auxiliary data segment.

10. The method of claim 5 wherein the step of associating the encoded video program and the local auxiliary data comprises creating a data stream including a first part of video type to be provided to a video display device, and a second part of non-video type to be provided to a non-video device.

11. A method of creating a customized video program for a viewer, comprising the steps of:

statistically multiplexing a plurality of encoded video programs;

adding an auxiliary data stream to form an intermediate data stream;

adding location data for the encoded video programs and for the auxiliary data to form a modified data stream for distribution to a plurality of receivers;

receiving the modified data stream at a specific receiver;

determining the location data from the modified data stream;

selecting one of the encoded video programs in accordance with a first predetermined characteristic of the receiver and the location data;

selecting local auxiliary data from the modified data stream in accordance with a second predetermined characteristic of the receiver and the location data; storing the local auxiliary data;

associating the encoded video program and the stored local auxiliary data to form a customized program; and providing the customized program to a viewer for decoding and display.

12. A system for forming a constant bit rate modified data stream for distribution to a plurality of receivers, comprising:

a program multiplexer for statistically multiplexing a plurality of encoded video programs to the modified data stream;

a data insertion controller coupled to receive a multiplexed program stream from the program multiplexer and for inserting auxiliary data therein to yield a modified data stream; and a program map insertion controller coupled to receive the modified data stream for adding location data for the encoded video programs and for the auxiliary data to the modified data stream.

13. The system of claim 12 wherein the data insertion controller comprises:

a first detector for providing an insertion signal upon detecting fill packet intervals of a minimum duration within a primary video data stream incorporating the statistically multiplexed encoded video programs;

a first buffer for holding portions of the auxiliary data; and first multiplexing logic, connected to the first detector and the first buffer, for inserting at least one segment of the auxiliary data into the primary video data stream.

14. The system of claim 13 wherein the program map insertion controller comprises:

a synchronization detector coupled to receive the modified data stream for detecting a synchronization signal therein;

a timing device, connected to communicate with the synchronization detector, for providing a control signal during a predetermined interval after detection of the synchronization signal;

a second buffer for holding at least a portion of the location data; and second multiplexing logic, responsive to the timing device and to the second buffer, for multiplexing the buffered location data and the received data stream.

15. The system of claim 14 configured to be compatible with the MPEG standard.

16. A system for creating a customized display stream for an individual receiver from a modified data stream sent to a plurality of receivers, comprising:

a program selector coupled to receive a modified data stream for determining location data therefrom, the modified data stream comprising:

a statistically multiplexed portion comprising one or more encoded video programs; and an auxiliary data portion comprising auxiliary data inserted in place of fill data;

first demultiplexing logic for selecting an encoded video program from the statistically multiplexed portion of the modified data stream responsive to an identifier from the program selector and the location data;

second demultiplexing logic for selecting local auxiliary data from the auxiliary data portion of the modified data stream responsive to a second identifier from the program selector and the location data;

a storage device for storing the local auxiliary data from the second demultiplexing logic; and an augmentation unit for associating the encoded video program and the stored local auxiliary data to form a receiver-specific augmented video program for decoding and display.

17. A system for creating a customized display stream for an individual receiver from a modified data stream sent to a plurality of receivers, comprising:

a program selector coupled to receive a modified data stream for determining location data therefrom;

first demultiplexing logic for selecting an encoded video program from the modified data stream responsive to an identifier from the program selector and the location data;

second demultiplexing logic for selecting local auxiliary data from the modified data stream responsive to a second identifier from the program selector and the location data;

a storage device for storing the local auxiliary data from the second demultiplexing logic; and an augmentation unit for associating the encoded video program and the stored local auxiliary data to form a receiver-specific augmented video program for decoding and display;

wherein the second demultiplexing logic for selecting local auxiliary data from the modified data stream includes:

a packet selector, connected to the processor, for selecting local auxiliary data from the modified data stream in accordance with the location data; and a first buffer, connected to the packet selector for temporarily accumulating the selected local auxiliary data, and connected to deliver the selected local auxiliary data to the storage device in accordance with a fullness indication of the buffer.

18. The system of claim 17 wherein the augmentation unit for associating the encoded video program and the local auxiliary data comprises:

a second buffer for holding at least a portion of the local auxiliary data;

an insertion detector for determining an opportunity to insert a segment of the local auxiliary data into the encoded video program; and augmentation multiplexing logic for inserting the segment of the local auxiliary data into the insertion interval in accordance with a command from the insertion detector.

19. The system of claim 18 configured to be compatible with the MPEG standard.

20. The system of claim 19 wherein the insertion detector includes:

a first extractor for determining a presentation interval as a difference between a presentation time stamp and a system clock reference;

a second extractor for determining a duration of a segment of the local auxiliary data; and comparing logic, connected to the first and second extractors, for providing the insertion command to the augmentation multiplexing logic when the presentation interval is larger than the duration of the local auxiliary data segment.

21. The system of claim 16 wherein the augmentation unit outputs a data stream including a first part of video type to be provided to a video display device, and a second part of non-video type to be provided to a non-video device.

22. A system for creating a customized video program for a viewer, comprising:

a multiplexer for statistically multiplexing a plurality of encoded video programs;

a first controller for adding auxiliary data to the output of the multiplexer;

a second controller for adding location data for the encoded video programs and for the auxiliary data to the output of the first controller, thereby forming a modified data stream;

a distribution channel for distributing the modified data stream to at least one receiver;

a processor for determining location data from the distributed modified data stream;

a first demultiplexer for selecting an encoded video program from the modified data stream in accordance with a first predetermined characteristic of the processor and the location data;

a second demultiplexer for selecting local auxiliary data from the modified data stream in accordance with a second predetermined characteristic of the processor and the location data;

a storage device for storing the local auxiliary data from the second demultiplexer; and an augmentation unit for associating the encoded video program and the stored local auxiliary data to form a receiver-specific augmented video program for decoding and display.

23. A method of forming a modified data stream for distribution to a plurality of receivers, comprising the steps of:

statistically multiplexing a plurality of encoded video programs to form a primary data stream wherein, to occupy a constant bit rate data channel, additional data must be added to said primary data stream at one or more locations, said one or more locations comprising a fill portion;

inserting an auxiliary data stream to form an intermediate data stream, said auxiliary data stream inserted in said fill portion; and adding location data for the encoded video programs and for the auxiliary data; to form a modified data stream for distribution to a plurality of receivers capable of individually extracting selected portions of the modified data stream in accordance with the location data.

24. A method of forming a modified data stream for distribution to a plurality of receivers, comprising the steps of:

statistically multiplexing a plurality of encoded video programs:

monitoring the statistically multiplexed encoded video programs for the occurrence of a fill packet;

maintaining a buffer of auxiliary data segments;

replacing the fill packet with at least one segment of the auxiliary data stream from the buffer if the segment is smaller than the size of the fill packet; and adding location data for the encoded video programs and for the auxiliary data; to form a modified data stream for distribution to a plurality of receivers configured for individually extracting selected portions of the modified data stream in accordance with the location data.

25. A system for forming a modified data stream for distribution to a plurality of receivers, comprising:

a program multiplexer for statistically multiplexing a plurality of encoded video programs to the modified data stream;

a data insertion controller coupled to receive a multiplexed program stream from the program multiplexer and for inserting auxiliary data therein to yield the modified data stream; and a program map insertion controller coupled to receive the modified data stream for adding location data for the encoded video programs and for the auxiliary data to the modified data stream.

26. The system of claim 25 wherein the data insertion controller comprises:

a first detector for providing an insertion signal upon detecting fill packet intervals of a minimum duration within a primary video data stream incorporating the statistically multiplexed encoded video programs;

a first buffer for holding portions of the auxiliary data; and first multiplexing logic, connected to the first detector and the first buffer, for inserting at least one segment of the auxiliary data into the primary video data stream.

* * * * *

UNITED STATES PATENT AND TRADEMARK OFFICE
CERTIFICATE OF CORRECTION

PATENT NO. : 5,966,120

DATED : October 12, 1999

INVENTOR(S) : Efraim Arazi, et al.

It is certified that error appears in the above-identified patent and that said Letters Patent is hereby corrected as shown below:

Column 10, line 55, after "rate" insert --encoded video--.

Column 11, line 9, after "data" insert --stream--.

Column 11, line 12, after "packet" insert --, to form an intermediate data stream--.

Signed and Sealed this

Fifth Day of December, 2000

Attest:

Q. TODD DICKINSON

Attesting Officer

Director of Patents and Trademarks